US011995681B2

(12) United States Patent
Cao et al.

(10) Patent No.: US 11,995,681 B2
(45) Date of Patent: May 28, 2024

(54) GENERATING UNIQUE IDENTIFIERS

(71) Applicant: Comcast Cable Communications, LLC, Philadelphia, PA (US)

(72) Inventors: Yu Cao, Beijing (CN); Qiang Wang, Beijing (CN); Wenjing Lu, Beijing (CN); Ruofei Ma, Beijing (CN); Fan Yang, Beijing (CN)

(73) Assignee: Comcast Cable Communications, LLC, Philadelphia, PA (US)

( * ) Notice: Subject to any disclaimer, the term of this patent is extended or adjusted under 35 U.S.C. 154(b) by 367 days.

(21) Appl. No.: 17/168,794

(22) Filed: Feb. 5, 2021

(65) Prior Publication Data

US 2022/0141312 A1 May 5, 2022

Related U.S. Application Data

(63) Continuation of application No. PCT/CN2020/124688, filed on Oct. 29, 2020.

(51) Int. Cl.
| | |
|---|---|
| *G06Q 30/00* | (2023.01) |
| *G06Q 30/02* | (2023.01) |
| *G06Q 30/0251* | (2023.01) |
| *H04N 21/81* | (2011.01) |

(52) U.S. Cl.
CPC ......... *G06Q 30/0251* (2013.01); *G06Q 30/02* (2013.01); *H04N 21/812* (2013.01)

(58) Field of Classification Search
CPC .............. G06Q 30/0239–0271; H04N 21/812
See application file for complete search history.

(56) References Cited

U.S. PATENT DOCUMENTS

| | | | | |
|---|---|---|---|---|
| 7,590,672 | B2 * | 9/2009 | Slik | G06F 3/0685 |
| 8,364,720 | B2 * | 1/2013 | Levy | H04L 67/10 |
| | | | | 707/812 |
| 8,904,271 | B2 * | 12/2014 | Evans | H04N 9/8233 |
| | | | | 715/206 |
| 8,924,412 | B2 * | 12/2014 | Rhoads | H04N 21/4415 |
| | | | | 707/769 |
| 9,218,429 | B2 * | 12/2015 | Levy | H04N 21/235 |
| 9,275,157 | B2 * | 3/2016 | Levy | G06F 21/10 |
| 9,317,873 | B2 * | 4/2016 | Agrawal | G06F 16/9566 |
| 10,069,737 | B2 * | 9/2018 | Bao | H04W 4/18 |

(Continued)

FOREIGN PATENT DOCUMENTS

| | | |
|---|---|---|
| CN | 1567815 A | 1/2005 |
| CN | 106133774 A | 11/2016 |

(Continued)

OTHER PUBLICATIONS

Diminico, Pat, et al. "Capacity Requirement for On-Demand IPTV Services." AT&T Services, Ince, IEEE 2011. (Year: 2011).*

(Continued)

*Primary Examiner* — Luis A Brown
(74) *Attorney, Agent, or Firm* — Banner & Witcoff, Ltd.

(57) ABSTRACT

Systems, apparatuses, and methods are described for generating unique identifiers. Identifiers may be organized or grouped by different topics. Identifiers may be requested, generated, stored as groups, and may be allocated from those groups based on requests for identifiers to improve the efficiency of one or more computing devices or systems. The size of each group of identifiers may be adjusted.

20 Claims, 8 Drawing Sheets

(56) References Cited

U.S. PATENT DOCUMENTS

| | | | | |
|---|---|---|---|---|
| 10,108,630 B2* | 10/2018 | Kruse | ................... | G06F 16/122 |
| 10,402,869 B2* | 9/2019 | Agrawal | ................ | G06F 16/95 |
| 10,999,609 B2* | 5/2021 | Ramaley | ............ | H04N 21/8586 |
| 11,095,942 B2* | 8/2021 | Loheide | ................ | H04L 67/306 |
| 11,429,634 B2* | 8/2022 | Koorapati | ........... | G06F 16/1827 |
| 2003/0177198 A1* | 9/2003 | Yabe | ....................... | G06F 16/95 |
| | | | | 707/E17.107 |
| 2003/0204592 A1* | 10/2003 | Crouse-Kemp | .... | H04N 21/2221 |
| | | | | 348/E7.071 |
| 2011/0188439 A1* | 8/2011 | Mao | ................... | H04N 21/6405 |
| | | | | 370/312 |
| 2013/0198242 A1* | 8/2013 | Levy | .................... | H04N 21/252 |
| | | | | 707/803 |
| 2015/0026719 A1* | 1/2015 | Menon | ............... | H04N 21/2668 |
| | | | | 725/34 |
| 2015/0088663 A1* | 3/2015 | Schechter | .......... | G06Q 30/0271 |
| | | | | 705/14.67 |
| 2015/0205877 A1* | 7/2015 | Rhoads | ................. | G06Q 10/10 |
| | | | | 707/723 |
| 2015/0278881 A1* | 10/2015 | Agrawal | ................ | G06F 16/95 |
| | | | | 705/14.73 |
| 2016/0180410 A1* | 6/2016 | Agrawal | ............. | G06F 16/9566 |
| | | | | 705/14.73 |
| 2016/0188639 A1* | 6/2016 | Levy | .................. | H04N 21/2343 |
| | | | | 707/803 |
| 2017/0053314 A1* | 2/2017 | Glover | ............... | G06Q 30/0261 |
| 2017/0206553 A1* | 7/2017 | Lintermans | ........ | G06Q 30/0277 |
| 2018/0253505 A1* | 9/2018 | Levy | .................. | H04N 21/2355 |
| 2019/0058900 A1* | 2/2019 | Ramaley | .......... | H04N 21/26258 |
| 2020/0068236 A1* | 2/2020 | Whitton | ............... | H04N 21/812 |
| 2021/0160299 A1* | 5/2021 | Gordon | ................... | H04L 65/80 |

FOREIGN PATENT DOCUMENTS

| | | | | |
|---|---|---|---|---|
| CN | | 107924527 A | 4/2018 | |
| WO | WO-2015148458 A1 * | 10/2015 | ............. | G06F 16/95 |

OTHER PUBLICATIONS

Ericsson LM Discussion doc on processing and distribution subfunction configuration via F—C 3GPP TSG-SA4 Meeting #96 Tdoc S4-171129; Nov. 17, 2017.

International Search Report and Written Opinion—PCT/CN2020/124688—dated Jul. 26, 2021.

* cited by examiner

GENERATING UNIQUE IDENTIFIERS

CROSS REFERENCE TO RELATED APPLICATIONS

This application claims priority to and is a continuation of PCT/CN2020/124688, filed Oct. 29, 2020, the contents of which are hereby incorporated by reference in their entirety.

BACKGROUND

Unique identifiers may be used to identify objects in a system. For example, in a content delivery system, unique identifiers may be assigned to content items and/or other objects. It may be difficult to generate the identifiers efficiently.

SUMMARY

The following summary presents a simplified summary of certain features. The summary is not an extensive overview and is not intended to identify key or critical elements.

Systems, apparatuses, and methods are described for generating identifiers. Identifiers may be used to identify files, content items, transactions, accounts or any other objects. Identifiers may be organized or grouped by different topics. Each of the identifiers in one or more groups of identifiers may be used in connection with a particular topic. An identifier within a particular topic may be unique relative to the other identifiers within the same topic. This may allow identifiers within each topic and/or the objects to which the identifiers are assigned or otherwise associated with, to be monitored and/or managed separately. Unique identifiers may be requested, generated, stored as groups, and may be allocated from those groups based on requests for identifiers to improve the efficiency of one or more computing devices or systems. Using multiple groups of identifiers may improve efficiency, for example, by reducing network traffic, and/or increasing the speed with which identifiers can be provided. Sequential numbers may be used as IDs, which may improve efficiency, for example, by reducing storage space required to store identifiers. The size of each group of IDs may be adjusted based on the rate at which the IDs are requested and/or allocated. The size of each group of IDs may be adjusted based on network communication quality within one or more networks.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

The accompanying drawings, which form a part hereof, show examples of the disclosure. It is to be understood that the examples shown in the drawings and/or discussed herein are non-exclusive and that there are other examples of how the disclosure may be practiced.

Figure 1:
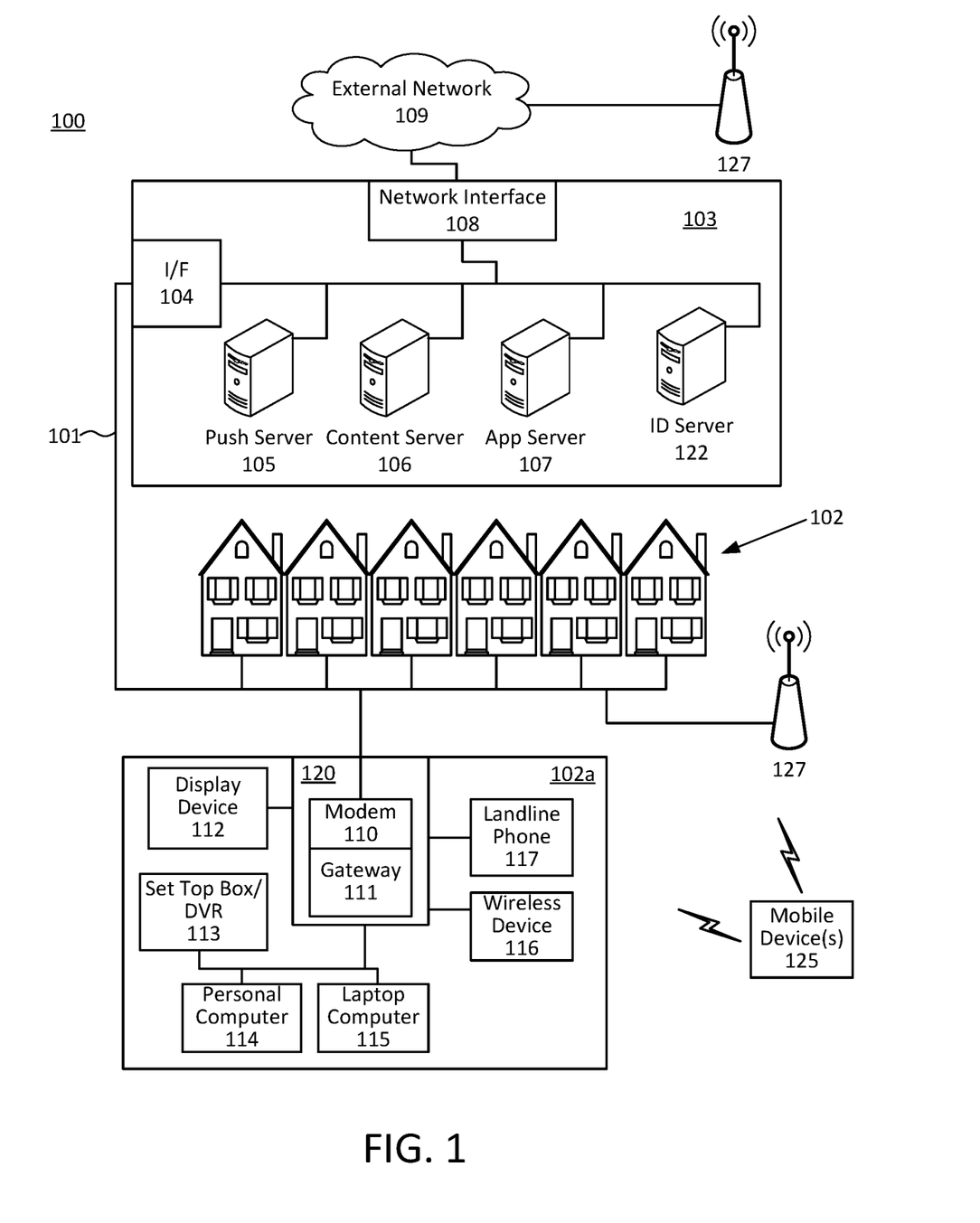
FIG. 1 shows an example communication network.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing device(s) configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the ID server 122 (described below), additional push, content, and/or application servers, and/or other types of servers. Although shown separately, the push server 105, the content server 106, the application server 107, the ID server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
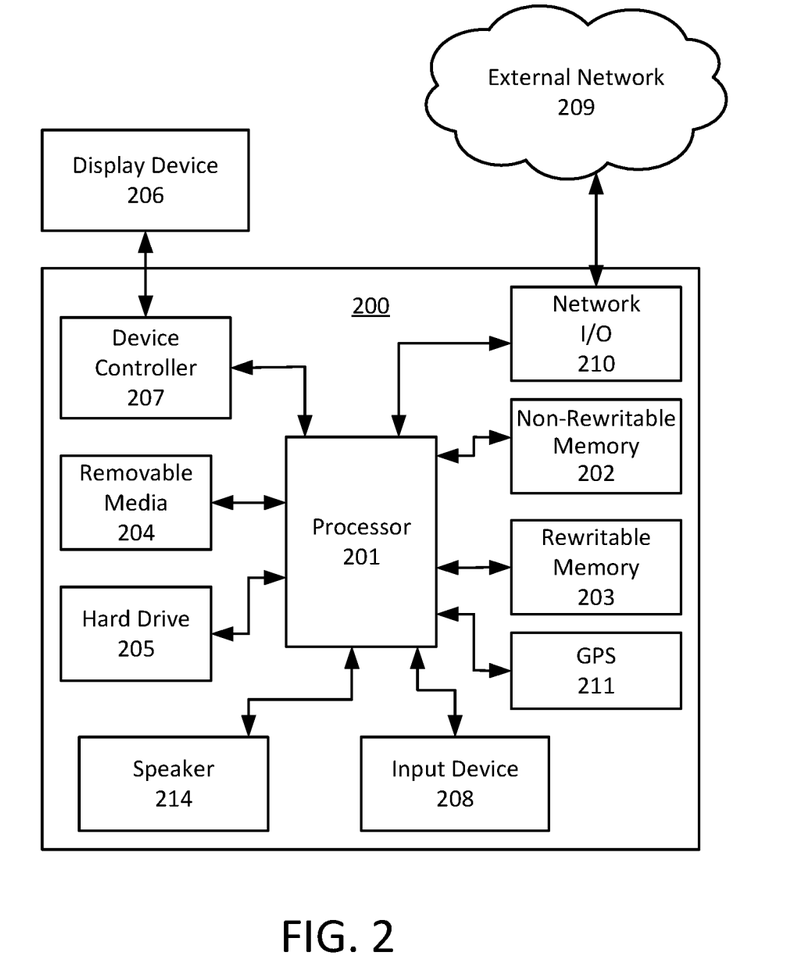
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., ID server 122, ID database 320, display 820, streaming device 830, ad server 802, data management platform 840, demand-side platform 850, and/or partner ad server 810, etc.). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer. Elements in FIG. 1 and/or FIG. 2 are examples of elements that can perform any of the operations or features described in connection with FIGS. 3-8 below.

Figure 3:
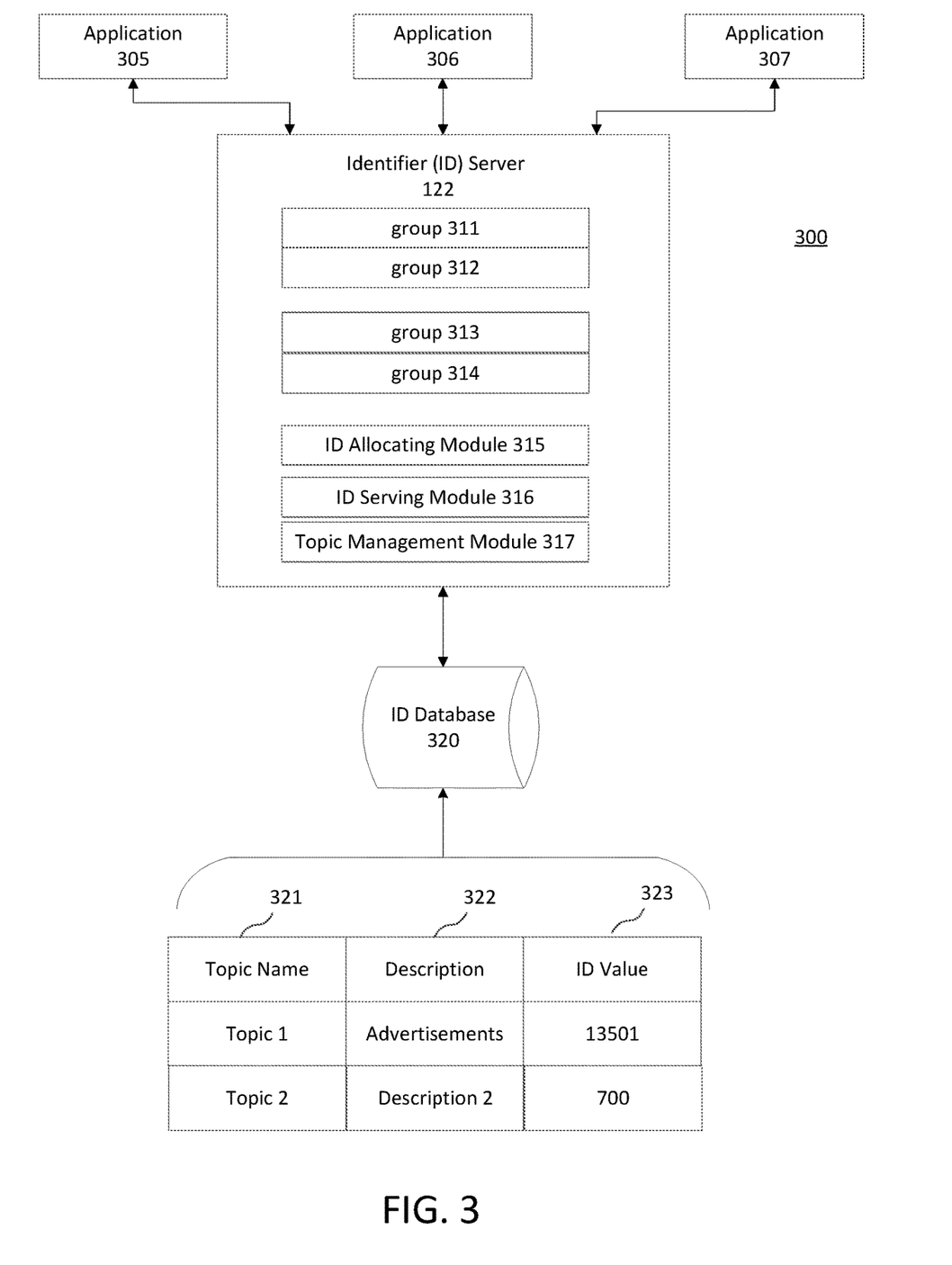
FIG. 3 shows an example system for generating and assigning identifiers.

FIG. 3 shows an example system 300 for generating and assigning identifiers. The system 300 may comprise one or more applications (e.g., applications 305-307), an identifier (ID) server 122, and an ID database 320. The applications 305-307 may comprise executable software running on the identification server 122 and/or may comprise software running on other devices (e.g., servers 105, 106, and/or 107). The applications 305-307 may send requests to the identifier (ID) server 122 for identifiers for content items. For example, an identifier may be needed to efficiently store, retrieve, or otherwise interact with a content item or other object. A content item may comprise a TV show, an advertisement, a movie, a social media video, music, and/or other type of audio and/or video content. A content item may comprise and/or otherwise be associated with one or more other types of data, such as metadata. Metadata may comprise and/or otherwise be associated with demographic data (e.g., geographic location, address, zip code, age, income, interests, etc.) for one or more viewers, information about a contract between one or more companies and/or users, and/or other types of information. A content item may comprise an asset as described in connection with FIG. 1 above.

Identifiers may be assigned to, and/or otherwise associated with, content items. Identifiers may be used to track content items, retrieve content items, distinguish content items from each other, or for other purposes. An identifier may be a unique identifier. For example, an identifier may be unique among all identifiers used for a particular purpose (e.g., to track content, to track a particular type of content, etc.). For example, an identifier may be a Universally Unique Identifier (UUID) or Globally Unique Identifier (GUID). An identifier may be unique within a content delivery network. The content delivery network may comprise the content delivery system 800 shown in FIG. 8. Additionally or alternatively, an identifier may be one number within a number sequence. Identifiers may be in ascending or descending order. For example, a first identifier may start at 1 and each subsequent identifier may increase by 1 (e.g., 1, 2, 3, etc.). Using sequential numbers may allow the use of less memory space to store identifiers and may allow more efficient indexing (e.g., it may be easier to locate and/or retrieve a content item from memory using the content item's identifier). Identifiers may be grouped or organized by different topics so that an identifier is unique to content items associated with one topic (e.g., identifiers for each topic may be stored separately in memory and/or identifiers may be duplicative across topics). For example, if there are three topics (e.g., topic A, topic B, and topic C), each topic A, B, and C may comprise identifiers that begin at 1 and increase sequentially from the first identifier.

Topics may comprise any category, business scenario, and/or subject matter. For example, there may be different topics for videos, advertisements, viewer accounts and/or viewer demographic information, movie and/or TV show genre, transactions (e.g., between devices and/or users of devices), or any other item that may be assigned an identifier. There may be different topics for different types of advertisements. For example, advertisements for services may be assigned to one topic and advertisements for products may be assigned to another topic. As an additional example, there may be different topics for different categories of advertisements (e.g., advertisements for cars, advertisements for food, advertisements for entertainment, etc.).

The ID server 122 may be configured to respond to requests from the applications 305-307 by assigning identifiers to content items and/or sending identifiers to the requesting application. Assigning an identifier may comprise notifying a database (and/or other module or device) to what the identifier has been assigned. The ID server 122 may send the identifier to the requesting application and the requesting application may notify a database to what the identifier has been assigned. The ID server 122 may comprise a plurality of sets, lists, arrays, and/or other groups (e.g., groups 311-314) of identifiers that may be assigned to content items. A group of identifiers may be an array, list, map, or other data structure that contains identifiers. one or more groups of identifiers may be, for example, stored in memory (e.g., local memory) on the ID server 122. A group may be stored in memory that can be accessed quickly (e.g., Random Access Memory or RAM). By storing a group of identifiers in memory (e.g., RAM), the ID server 122 may be able to access identifiers and respond to requests for identifiers more quickly (e.g., as opposed to retrieving an identifier from a solid-state drive, database, or other long-term storage). The plurality of groups may be part of a collection (e.g., with two, three, four, etc. groups in each collection). Each collection of groups may be assigned to a particular topic. For example, groups 311-312 may store identifiers for advertisements and groups 313-314 may store identifiers for TV shows. The ID server 122 may also comprise an ID allocating module 315 and ID serving module 316. The ID allocating module 315 may receive a request for an identifier from any one of the applications 305-307. The ID allocating module 315 may process the request (e.g., to determine what topic the request is for). The ID serving module 316 may retrieve the next available identifier from a group that corresponds to the topic of the request. The ID serving module 316 may send the identifier to the ID allocating module 315. The ID allocating module 315 may send the retrieved identifier to the application 305.

In each collection of groups, one group may be the current or allocating group and one or more groups may be the backup or pending group(s). For example, the group 311 may be the allocating group and the group 312 may be the backup group. The ID serving module 316 may retrieve identifiers from the allocating group until one or more of the identifiers (e.g., some or all of the identifiers) in the allocating group have been used. The backup group may replace the allocating group after it is determined that the allocating group no longer contains unused identifiers (e.g., each identifier within the allocating group has been assigned). The ID server 122 (e.g., the ID serving module 316) may send a request to the ID database 320 for a new group. The new group may become the backup group. The allocation of identifiers and/or replacement of groups may be performed repeatedly. For example, as additional identifiers are requested and used, an allocating group may be replaced by its backup group and a new group may be requested to become the next backup group. The size of each new group may scale over time. The size of each group (e.g., the quantity of identifiers that each group contains) may vary depending on an identifier query rate, request rate, and/or other usage rate (e.g., the rate at which requests are made for identifiers). A usage rate associated with stored identifiers may indicate any of the rates associated with requests for identifiers, any of the rates associated with sending identifiers based on a request, or any rate discussed in connection with FIG. 1-8. Additionally or alternatively, the size of each group may vary depending on a time period associated with a group or plurality of identifiers (e.g., the amount of time that lapses between sending a request for a new group and receiving the new group from the database 320).

Adjusting the size of a group may improve the functioning of a computer and/or system. Adjusting the size of a group based on network conditions and/or system usage may improve memory usage and/or the speed at which identifiers may be provided. By adjusting the size of a group of identifiers, a computing device may ensure that an appropriate number of identifiers are retrieved. For example, if the size of the group is too large, the computing device may use too much memory to store the group. If the size of the group is too small, the computing device may need to send requests for additional groups of identifiers too frequently. By sending fewer requests for groups, traffic on one or more networks may be reduced. Group size scaling is discussed in more detail below in connection with FIGS. 6-8. Using multiple groups of identifiers may improve efficiency, for example, by reducing network traffic, and/or increasing the speed with which identifiers can be provided. Additionally or alternatively, using sequential numbers as identifiers may improve the functioning of a computer and/or system. Sequential numbers may require less storage space than fixed-length identifiers. Sequential numbers may be sortable and more human-readable than other types of identifiers. Using sequential numbers may eliminate the need to maintain timestamps or other information that may be required using other types of identifiers.

The ID database 320 may be configured to generate and store identifiers. The ID database 320 may be stored on the ID server 122 or may be stored in a separate computing device (e.g., a separate server). The ID database 320 may be a relational database, a NoSQL database, a sharding database, or any other type of database. Identifiers may be generated and stored separately for each topic in the ID database 320. The ID database 320 may keep track of identifiers and to what topic each identifier corresponds. The ID database 320 may send groups containing identifiers to the ID server 122 if, for example, the ID server 122 requests additional identifiers. The database 320 may store a topic name 321, a description 322, and/or an ID value 323 for each topic. The topic name 321 may be unique to each topic and may be used to identify a topic. The ID value 323 of a topic may be the next identifier that the ID database 320 may generate for the topic. The ID value 323 may be updated as additional groups are generated. For example, the ID value 323 for topic 1 may be 13501. The database 320 may generate a group containing the identifiers 13501-14000, for example, if the ID database 320 receives a request for a new group containing 500 identifiers. The ID value 323 for topic 1 may be updated to 14001 because 14001 is the next available identifier for Topic 1.

The topic management module 317 may be configured to modify, delete, and/or create new topics. The topic management module 317 may be software that executes on the ID server 122. Alternatively, the topic management module 317 may execute on a computing device that is separate from the ID server 122 (e.g., a separate server).

Figure 4:
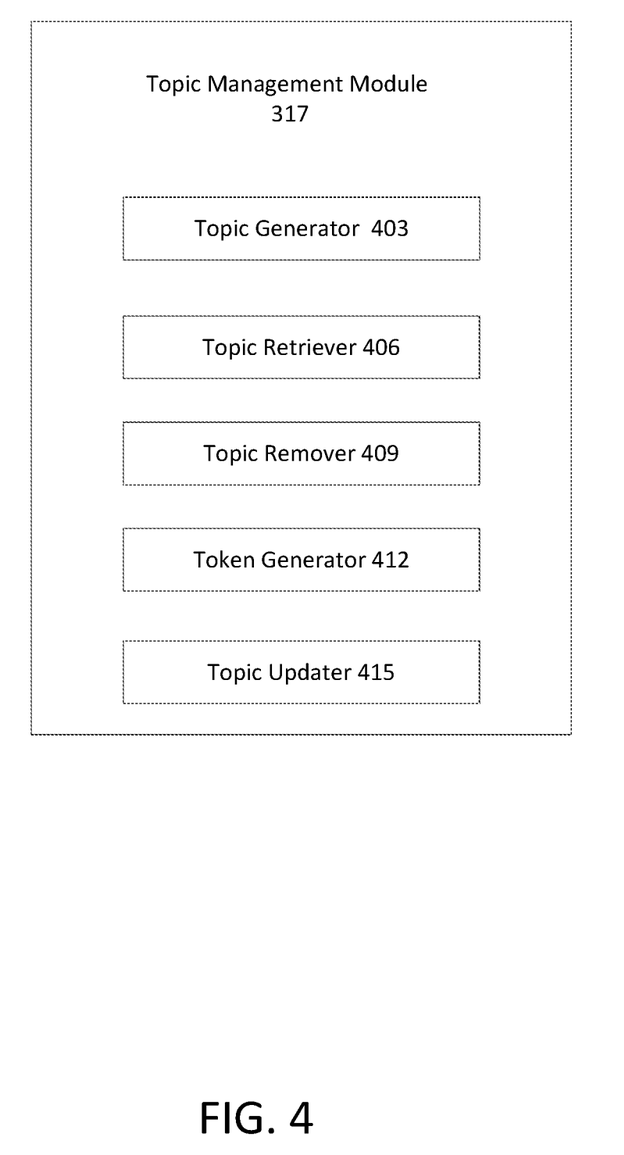
FIG. 4 shows an example topic management module.

FIG. 4 shows an example topic management module 317. The topic management module 317 may comprise a topic generator 403, a topic retriever 406, a topic remover 409, a token generator 412, and a topic updater 415. The topic generator 403 may be configured to create new topics. The topic generator 403 may create a new topic for Company A, with its own topic name, description, and ID value, for example, if the Company A requests identifiers for its advertisements. The topic generator 403 may be configured to set an ID value for a new topic if the new topic is migrated from a separate identifier system. The topic retriever 406 may be configured to send information about the status of a topic (e.g., through an application programming interface). For example, the topic retriever 406 may send the topic name, description, or value to a computing device (e.g., the data management platform 840 shown in FIG. 8). The topic remover 409 may be configured to delete or remove a topic. The topic remover 409 may delete a topic by removing a topic from memory permanently. The topic remover 409 may delete a topic by performing a soft deletion. A soft deletion may change the status of the topic (e.g., from active to inactive). The topic and all of its associated data may remain stored in memory, for example, if a soft deletion is performed on a topic. The topic deleted using a soft deletion may be restored, for example, by changing its status from inactive to active. The token generator 412 may generate and/or send tokens (e.g., security tokens, cryptographic tokens, etc.) that may be used to validate requests or other operations on topics. A token may be generated for a particular topic and/or may allow a computing device to modify the topic. For example, a user may sign on to an account associated with topic 1. The computing device (e.g., computing device 200) used by the user may receive a token generated by the token generator 412. The token may be used to validate any operation on topic 1 that is requested by the computing device (e.g., a modification of topic 1, deletion of topic 1, etc.). The tokens generated by the token generator 412 may be used to prevent incorrect operations (e.g., modifying the wrong topic, creating a new topic without permission, etc.). For example, a computing device may not be able to delete a particular topic if the computing device does not have the correct token. A topic may be monitored via a computing device (e.g., any computing device discussed in connection with FIGS. 1-2). The computing device may display the name of the topic, the value of the next topic ID, the status of any groups associated with the topic (e.g., capacity, head of a group, tail of a group, working state of a group, etc.).

By organizing identifiers based on topics, identifiers and/or topics may be monitored to determine whether any problems arise. For example, the ID server 122 and/or one or more other computing devices associated with the system 300 may determine that too many identifiers are being generated for a particular type of content item (e.g., advertisements). For example, the ID server 122 may compare the quantity of identifiers being generated and/or assigned for the type of content item over a time period (e.g., an hour, day, month, quarter, etc.) with historical averages for similar time periods. The ID server 122 may determine that there is a problem (e.g., unhealthy status) with the topic, for example, if the quantity of identifiers generated with the time period is above a threshold (e.g., above 20% of a historical average, etc.). Organizing identifiers into topics may make it easier for problems to be detected.

Figure 5:
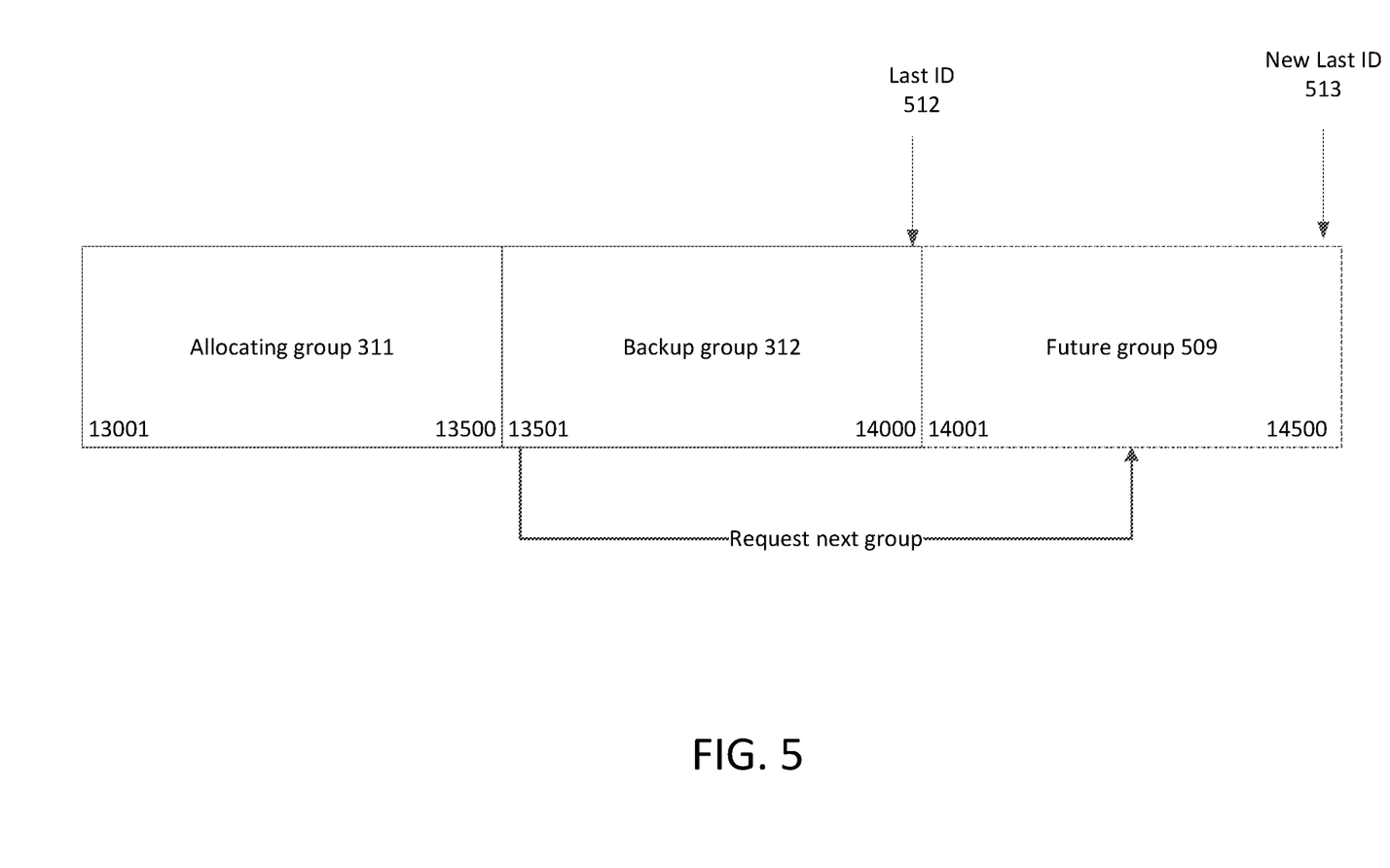
FIG. 5 shows example groups of identifiers.

FIG. 5 shows example groups of identifiers. Each group of identifiers may be stored in a buffer or otherwise located in computer memory (e.g., RAM). Identifiers from the groups may be used by the system 300 for a particular topic (e.g., topic 1 in FIG. 3). The ID server 122 may receive requests for identifiers from one or more applications (e.g., the applications 305-307). Identifiers from an allocating group 311 may be provided in response to the requests until some or all of the identifiers in the allocating group 311 are used. For example, the first identifier in the allocating group 311 may be 13001 and the last identifier in the allocating group 311 may be 13500. The system 300 may use identifiers from the backup group 312 (e.g., identifiers 13501 through 14000) to respond to additional requests for identifiers, for example, if all of the identifiers in the allocating group 311 have been used (e.g., identifiers 13001 through 13500).

The ID server 122 and/or one or more other devices associated with the system 300 may monitor the quantity of remaining identifiers in the allocating group 311. The ID server 122 may send a request to the ID database 320 for a future group 509, for example, based on a usage level of identifiers in the allocating group 311. The usage level may indicate an amount of identifiers that need to be used or assigned in an allocating group (e.g., a first group) before a request for a backup group (e.g., a second group) is sent. The usage level may indicate that the quantity of unused identifiers in the allocating group 311 has decreased below a threshold (e.g., less than 20% of the identifiers in the group remain unused, less than 10% remain, etc.). Alternatively, the ID server 122 may wait until the first identifier in the backup group 312 is used before requesting the future group 509. The backup group 312 may be used as the new allocating group and the future group 509 may be used as the new backup group, for example, if no unused identifiers remain in the allocating group 311. For example, the allocating group that has been used up may be removed or deleted. The ID value for the topic may be updated to a value that is next in sequence after the new last identifier 513 of the future group 509 (e.g., 14500), for example, if the future group 509 is created. The ID value for the topic may be updated to 145001, for example, if the new last identifier 513 is 14500.

Figure 6:
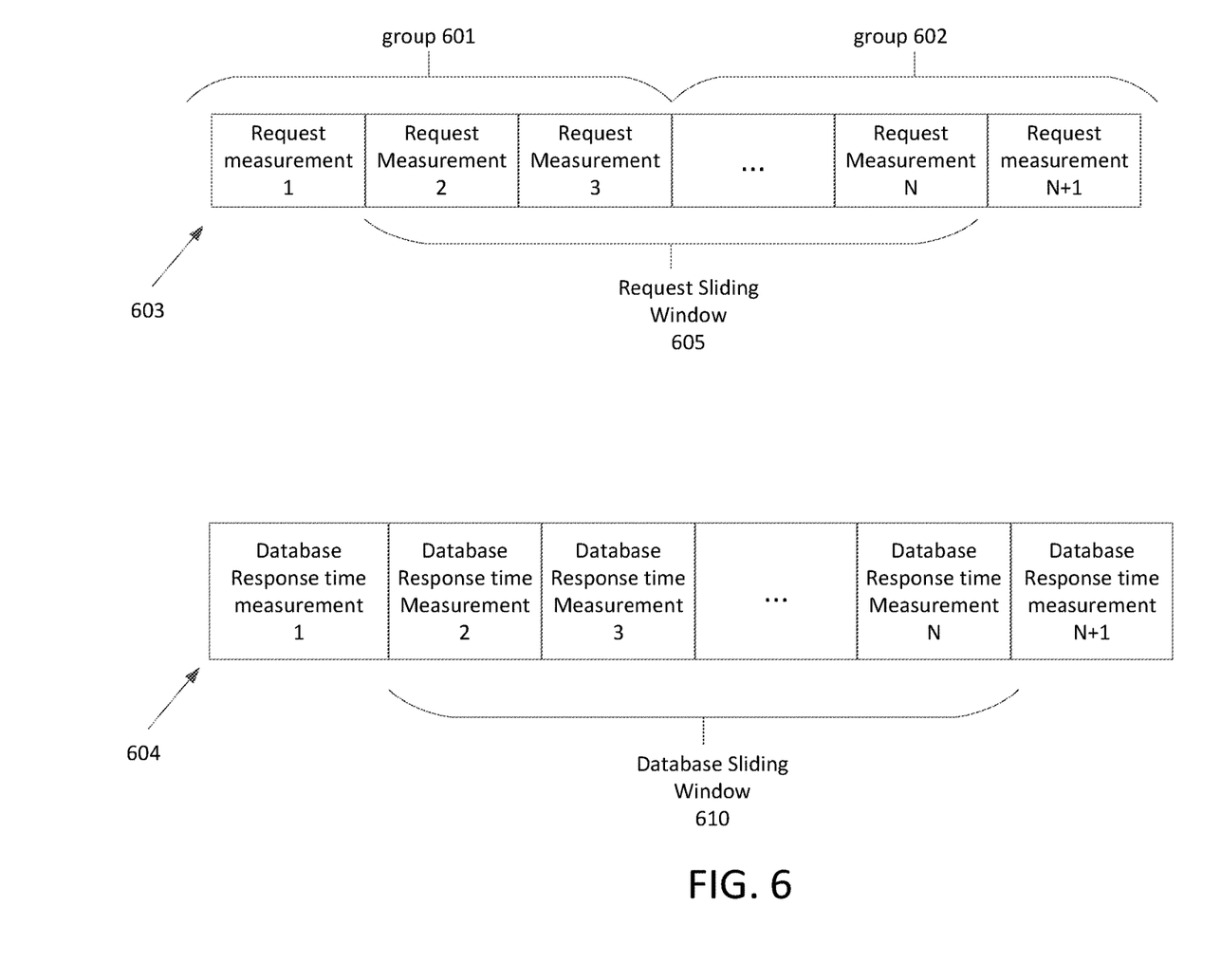
FIG. 6 shows example arrays for storing measurements.

FIG. 6 shows example arrays (e.g., lists, sequences, etc.) for storing measurements. The arrays may be used by the system 300 to determine the size of a group (e.g., a quantity of additional identifiers). The size of a group may indicate a quantity of identifiers the group contains and/or the memory space used by the group. The size of a group of identifiers may vary based on a usage rate for identifiers and/or the amount of time it takes for a response to a request for a new group to be received. The size of groups generated (e.g., generated by the ID database 320 and/or the ID server 122) may be increased, for example, if demand for, or usage of identifiers is high (e.g., if there are many identifier requests within a time period). The ID database 320 may decrease the size of groups generated, for example, if demand for identifiers is low (e.g., if identifier requests within a time period decrease). The size of the group may be based on the amount of time it takes for a new group to arrive from the ID database 320, for example, after or in response to a request for a new group. The size of the group may vary based on the speed of the network (e.g., bandwidth, throughput, connection quality between any two devices in the network, packet delay variance or network jitter, etc.), for example, if the ID database 320 and the ID server 122 are connected via a network (e.g., the external network 109).

The size of a group may be determined using one or more values (e.g., for use in a formula). The one or more values may include the usage rate, a duration value (e.g., representing the amount of time it takes for a new group to arrive as discussed above), a retry value, a high bound, and/or a low bound. The usage rate for identifiers may be determined based on the quantity of requests received by the ID server 122 during a time period. The ID server 122 may periodically record the quantity of requests it receives for identifiers. For example, the quantity of requests may be recorded in request array 603. A request measurement may be a measured quantity of requests for unique identifiers received over a time period. Although only one array of request measurements is shown in FIG. 6, there may any quantity of arrays (e.g., there may be a separate request array for each topic). The ID server 122 may record the quantity of requests it receives every second, millisecond, minute, or any other time period. The quantity of requests may be recorded separately for each topic. The ID server 122 may record the quantity of requests that occur every second for topic 1 and the ID server 122 may separately record the quantity of requests that occur every second for topic 2, for example, if the recording time period is one second. The usage rate may be determined based on the request measurements within a sliding window 605. As shown in FIG. 6, the sliding window 605 may include request measurements 2-N (e.g., N may be any positive integer), for example, at a time that the ID server 122 determines that a new group should be requested. The ID server 122 may determine a request measurement from within the sliding window 605 to be used as the usage rate. For example, the ID server 122 may use the highest request measurement or the lowest request measurement within the sliding window 605 as the usage rate. Alternatively, the ID server 122 may use the average of each request measurement in the sliding window 605 as the usage rate. A sliding window (e.g., the sliding window 605 and/or 610) may change over time. For example, the sliding window 605 may correspond to measurements taken at a time immediately preceding a time that the ID server 122 initiates determination of group size. For example, the sliding window 605 (or the sliding window 610) may include only a quantity (e.g., 3, 5, 10, 50, etc.) of the most recent measurements made. Using a sliding window may allow the usage rate and/or duration value to more accurately reflect the demand and/or network speed within the system 300. The sliding window 605 may use measurements taken during a time period when identifiers from group 601 were being assigned and/or during a time period when identifiers from group 602 were being assigned. For example, the sliding window 605 may comprise request measurement 2, request measurement 3, and request measurement N. Request measurement 2 and request measurement 3 may have been recorded at a time period during which group 601 was used as the allocating group. Request measurement N may have been recorded after group 602 replaced group 601 as the allocating group.

Additionally or alternatively, the usage rate may be based on how quickly identifiers in a group are used. A group may be divided into equal portions of identifiers and the ID server 122 may determine how long it takes for each portion of identifiers to be used or assigned to content items (e.g., the time for each portion to be used may be stored in an array or other data structure). For example, the quantity of identifiers of an allocating group may be 200 identifiers. A sliding window may include 10 measurements. The allocating group may be divided by the quantity of measurements in the sliding window so that it contains 10 portions with 20 identifiers each. Each request measurement in array 603 may be the quantity of time that it takes for each portion of 20 identifiers to be used (e.g., there may be 10 recorded times in the sliding window or array 603). The usage rate may be based on the shortest time (e.g., of the 10 recorded times). For example, the usage rate may be the quantity of identifiers in one portion divided by the shortest time (e.g., of the 10 recorded times in the sliding window or array 603). In this example if the shortest time was 2 seconds, the usage rate may be 10 ($20/2=10$). Alternatively, the usage rate may be based on the average time (e.g., of the 10 recorded times). For example, the usage rate may be the quantity of identifiers in one portion divided by the average time (e.g., the average of the 10 recorded times in the sliding window or array 603). In this example, if the average time to use each portion of identifiers was 4 seconds, the usage rate may be 5 ($20/4=5$).

The duration value may be determined based on the amount of time it takes for the ID server 122 to receive a new group from the ID database 320. The ID server may record the quantity of time (e.g., the database response time measurements shown in the array 604) between when it sends a request to the ID database 320 and when it receives the new group. The ID server 122 may record the database response time measurement each time it receives a new group (e.g., in the array 604). The database response time measurements may be stored sequentially. The duration value may be determined based on a sliding window 610 of the database response time measurements in the array 604. As shown in FIG. 6, the sliding window 610 may include database response time measurements 2-N for example, at a time that the ID server 122 determines that a new group should be requested. The ID server 122 may determine a database response time measurement from within the sliding window 610 to be used as the duration value. For example, the ID server 122 may use the longest database response time measurement or the shortest database response time measurement as the duration value. Alternatively, the ID server 122 may use the average database response time measurement in the sliding window 610 as the duration value. The array 604 may include measurements associated with any topic (e.g., all database response time measurements associated with all topics may be recorded in the array 604).

Additionally or alternatively, the size of a new group may be based on a retry value, a high bound, and/or a low bound. The retry value may be a predetermined number that indicates a quantity of times the request for a new group may fail or is expected to fail (e.g., due to connectivity, network jitter, TCP timeout, low bandwidth, low throughput, high latency, or other problems). The high bound may be the maximum quantity of identifiers a new group may contain. The low bound may be the minimum quantity of identifiers a new group may contain. The ID server 122 and/or the ID database 320 may use the usage rate, duration value, retry value, high bound, and/or low bound to determine the size of a new group. For example, the size of a new group (e.g., the quantity of identifiers within the group) may be equal to the product of the usage rate, the duration value, and the retry value (e.g., usage rate×duration value×retry value). The size of the new group may be reduced to the high bound or below the high bound for example, if a value calculated based on demand, duration, and retry exceeds the high bound or is equal to the high bound. The size of the new group may be increased above or to the low bound for example, if a value calculated based on demand, duration, and/or retry is less than the low bound or is equal to the low bound.

Figure 7:
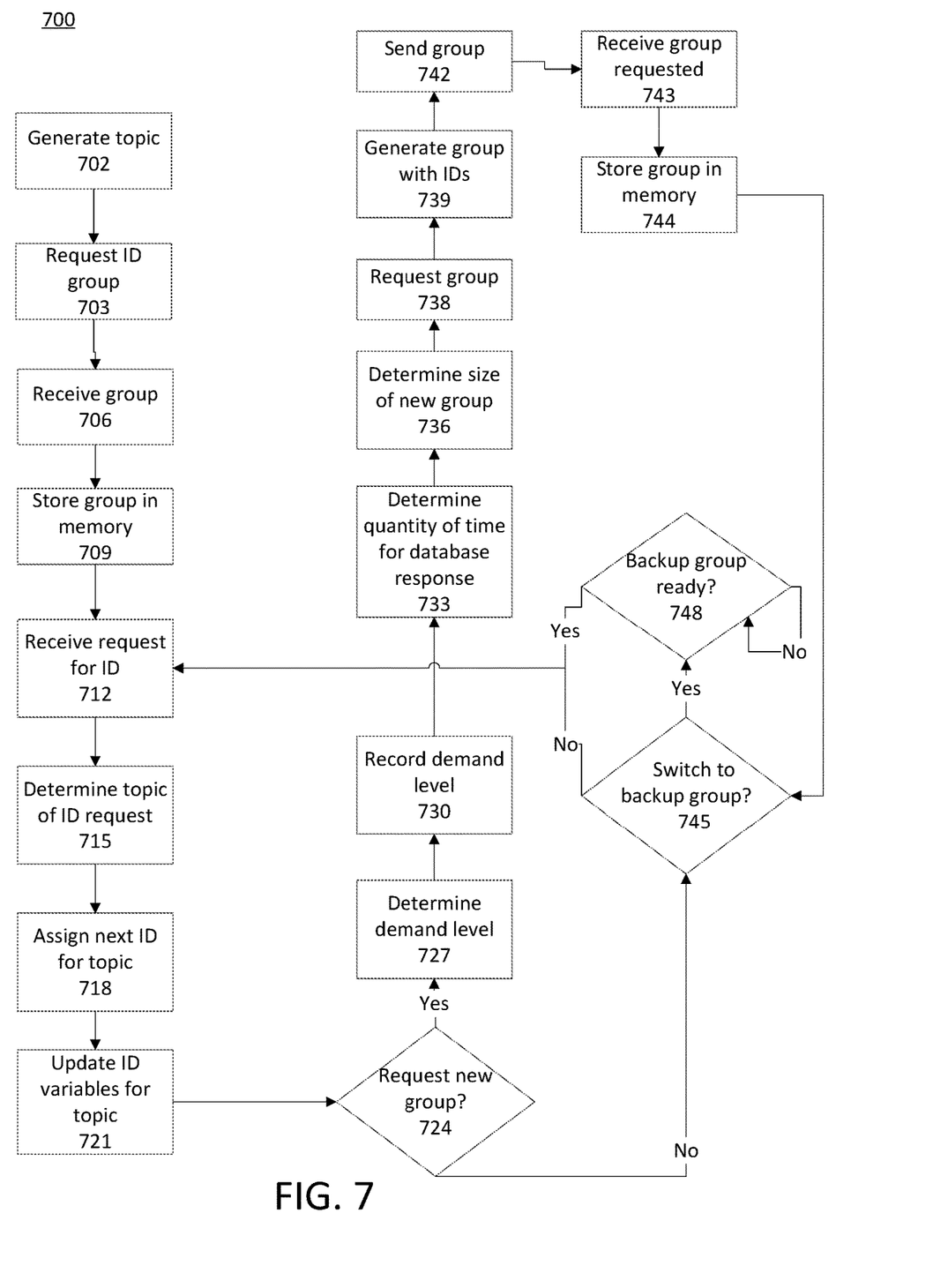
FIG. 7 shows an example method for generating and assigning identifiers.

FIG. 7 shows an example method 700 for generating and assigning identifiers (e.g., to content items). The example method 700 may be performed using any device and/or data structure described in connection with FIGS. 1-6 and/or other device(s). Although one or more steps of the example method of FIG. 7 are described for convenience as being performed by the ID server 122 and/or the ID database 320, one, some, or all of such steps may be performed by one or more other devices, and steps may be distributed among one or more devices, including any devices such as those described in connection with FIGS. 1-6. Although one or more steps may be described as being performed for or with a particular topic (e.g., a topic as described in connection with FIGS. 3-6), some or all of such steps may also or alternatively be performed for any or all topics. One or more steps of the example method of FIG. 7 may be rearranged, modified, repeated, and/or omitted. Multiple instantiations of the method of FIG. 7 may be performed simultaneously, for example, in separate programming threads. Each instantiation of the method of FIG. 7 may correspond to a different topic. For example, while one instantiation of the method of FIG. 7 is performed in connection with one topic, another instantiation of the method of FIG. 7 may be separately and/or simultaneously performed in connection with another topic. For a given topic, each group of identifiers may comprise identifiers that are unique relative to each other and relative to all other identifiers of other groups associated with that given topic. As to identifiers associated with different topics, however, identifiers may not necessarily be unique. For example, a first identifier from a group of identifiers associated with one topic may be the same as a second identifier from another group of identifiers associated with a different topic.

At step 702 a new topic may be generated (e.g., as described in connection with FIGS. 3-4 above). At step 703, an ID group may be requested (e.g., for the new topic requested in step 702). For example, the ID server 122 may send a request for a group containing identifiers to the ID database 320. The ID group may be requested, for example, in response to the new topic being generated in step 702. The ID server 122 may record the time at which the request for a group is sent. At step 706, the ID group requested in step 703 may be received. For example, the ID server 122 may receive the ID group from the ID database 320. The first and/or second group for a topic may have a predetermined size (e.g., the size may be the low bound described above in connection with FIG. 6). The ID server 122 may record the time at which the group is received. At step 709, the group received in step 706 may be stored. The ID server 122 may store the group in memory (e.g., in local memory on the ID server 122, in RAM, etc.) Storing the group may comprise storing the group in a buffer, array, list, or other structure. Each ID in the stored group may be unique relative to other identifiers in the stored group.

At step 712, a request for an identifier may be received. For example, the ID server 122 may receive a request for an identifier from any one of the applications 305-307. The request may be for an identifier of a plurality of identifiers that are all unique relative to one another. Additionally or alternatively, the plurality of identifiers may be unique relative to other identifiers that have been or may be assigned in connection with a particular topic. The request may indicate topic or other classification information that may be used to indicate a plurality of identifiers that are all unique relative to each other, and for which the request is seeking a portion of that plurality of identifiers. A separate process, not shown in FIG. 7, may receive requests for identifiers, determine a topic associated with a request for an identifier, and route the request to the instantiation of method of FIG. 7 corresponding to the determined topic. At step 715, the topic corresponding to the request received in step 712 may be determined. Additionally or alternatively, the ID server 122 may confirm that the request is correctly associated with a topic of an instantiation of the method of FIG. 7. The request may include the name of the topic, which for example, may be used by the ID server 122 to determine the topic. Alternatively, the request for an ID may have other information that indicates the topic for which an identifier is being requested. For example, the request may include or indicate the content item for which an identifier is being requested. The ID server 122 may determine the correct topic based on the content item. The ID server 122 may store a plurality of groups corresponding to different topics. The ID server 122 may determine from which group an identifier should be retrieved based on the information contained in the ID request. For example, the request for an identifier may indicate that the identifier is needed for an advertisement and the ID server 122 may determine that the request corresponds to an advertisement topic.

At step 718, the next unassigned identifier for the topic determined in step 715 may be assigned. For example, the ID server 122 may send, based on first requests from one or more providers of content items for a content delivery network, identifiers of a stored plurality of identifiers. The ID server 122 may use the topic determined in step 715 to determine the appropriate group of identifiers for the topic. The ID server 122 may assign the next identifier in the group to the content item in the request received in step 712. For example, the allocating module 315 may receive an identifier from the ID serving module 316 and may send the identifier as a response to the request received in step 712 (or in the most recent performance of step 712 if occurring in a subsequent iteration). The identifier may be sent to any one of the applications 305-307. The ID server 122 may mark the identifier as used. For example, the ID server 122 may delete the identifier from the group and/or may store the identifier in a data structure (e.g., a map) that associates the identifier with its corresponding content item. Additionally or alternatively, the ID server 122 may set a flag or otherwise mark the identifier as used. At step 721, one or more ID variables for the topic of the ID assigned in step 718 may be updated. ID variables may include an offset value that tracks the next available ID in the group. The offset value may be updated to indicate the next available ID, for example, if an ID is assigned to a content item. For example, if the IDs for the topic are sequential, the offset value may be increased (e.g., by adding 1). Alternatively, the offset value may indicate a memory location of the next available ID within the group.

At step 724, whether a new group is needed may be determined. For example, the ID server 122 may determine whether a new group should be requested from the database 320 as described above in connection with FIG. 3 and/or FIG. 5. For example, if the identifier assigned in step 718 is the first identifier in a backup group, the ID server 122 may determine that an additional group should be requested. Alternatively, the ID server 122 may determine that a new group should be requested if a threshold percentage of the identifiers in the allocating group have been used (e.g., 30%, 70%, 90%, etc.). Alternatively or additionally, the ID server 122 may determine that a new group should be requested if a threshold percentage of the identifiers in the backup group have been used (e.g., 30%, 70%, 90%, etc.). If it is determined that a new group should be requested, step 727 may be performed. If it is determined that a new group should not be requested, step 745 may be performed.

At step 727, a usage rate may be determined (e.g., for the topic determined in step 715). The usage rate may comprise a number. The usage rate may indicate the quantity of requests received for a topic (e.g., the topic determined in step 715) within a time period. The usage rate may be determined as described in connection with FIG. 6 above. At step 730, the usage rate may be recorded. For example, a usage rate may be recorded in an array as described above in connection with FIG. 6. At step 733, the quantity of time for a database response may be determined. The quantity of time may comprise a duration value and/or may be determined as described in connection with FIG. 6. For example, the ID server 122 may determine a quantity of time that lapses between requesting a group and receiving the group from the ID database 320. For example, the ID server 122 may subtract the time at which the request for the group was sent to the ID database 320 (e.g., in step 703 or step 724) from the time at which the group was received from the ID database 320 (e.g., in step 706 or in step 743). The ID server 122 may store the measurement in an array of measurements (e.g., in array 604 as described in connection with FIG. 6 above).

At step 736, the size of the new group may be determined. For example, the ID server 122 may determine the size of the new group (e.g., the future group 509 as discussed in connection with FIG. 5) using the usage rate determined in step 727 and/or the quantity of time determined in step 733. For example, the ID server 122 may determine, based on one or more of a usage rate associated with a stored first plurality of identifiers or a time period associated with the stored first plurality of identifiers, a quantity of additional identifiers. The size of the new group may be determined as described in connection with FIG. 6. At step 738, a group may be requested. For example, the ID server 122 may send a request to the ID database 320 for a new group. For example, the ID server 122 may send, before sending of at least a portion of the first plurality of identifiers (e.g., that were requested in step 712), a request indicating a determined quantity of additional identifiers. The request may be for additional unique identifiers (e.g., unique relative to each other, unique relative to identifiers received in step 706, and/or unique relative to identifiers in any groups received in previous iterations of the method of FIG. 7). The request may include the size of the new group as determined in step 736. Alternatively, the request may indicate the usage rate determined in step 727, and/or the quantity of time determined in step 733. The ID database 320 may determine the size of the new group, for example, based on the usage rate and/or the quantity of time indicated in the request.

At step 739, the group may be generated and allocated with IDs. For example, the ID database 320 may generate a quantity of identifiers to store in the group. The quantity of identifiers may be equal to the size of the group. The ID database 320 may use the offset value updated in step 721 as the first identifier in the group, for example, if the identifiers are sequential. For example, if the offset value is 14001 and the group size is 500, the ID database 320 may generate identifiers 14001 through 14500 and store them in the group (e.g., as discussed in connection with FIG. 5). At step 742, the group generated in step 739 may be sent. For example, the ID database 320 may send the group to the ID server 122. At step 743, the group requested in the most recent performance of step 738 may be received (e.g., by the ID server 122).

At step 744 the group received in step 743 may be stored. For example, the ID server 122 may store a plurality of identifiers received based on the request (e.g., in step 738), wherein each identifier, of the plurality of identifiers, is unique relative to other identifiers of a first plurality of identifiers and relative to each identifier in a second plurality of identifiers. Each identifier in the stored group may be unique relative to other identifiers in the group, and/or unique relative to all other identifiers of the group stored in step 709, and/or unique relative to identifiers stored in step 744 performed in previous iterations of the method of FIG. 7.

Step 745 may be performed based on the performance of step 744. Alternatively, step 745 may be performed, for example, if it is not determined to request a new group at step 724. At step 745, whether the backup group should be used may be determined. For example, the ID server 122 may determine that it should switch from using the allocating group 311 to the backup group 312. The ID server 122 may determine to switch groups, for example, if the IDs in the allocating group 311 have been used (e.g., if all of the IDs have been used or assigned). Step 712 may be performed and the ID server 122 may continue to receive requests for IDs, for example, if the allocating group 311 has not been used (e.g., not all of the IDs in the group 311 have been used or assigned). Step 748 may be performed, for example, if it is determined to switch to the backup group.

At step 748, whether the backup group is ready may be determined. For example, the ID server 122 may determine whether a group requested in step 738 has been received and/or stored. For example, one process of the ID server 122 may wait for one or more other processes of the ID server 122 to complete steps 743 and 744. If the group has not been received and/or stored, the ID server 122 may wait until the group is received. Step 712 may be performed and the ID server 122 may continue to receive requests for IDs, for example, if the group has been received and/or stored.

Figure 8:
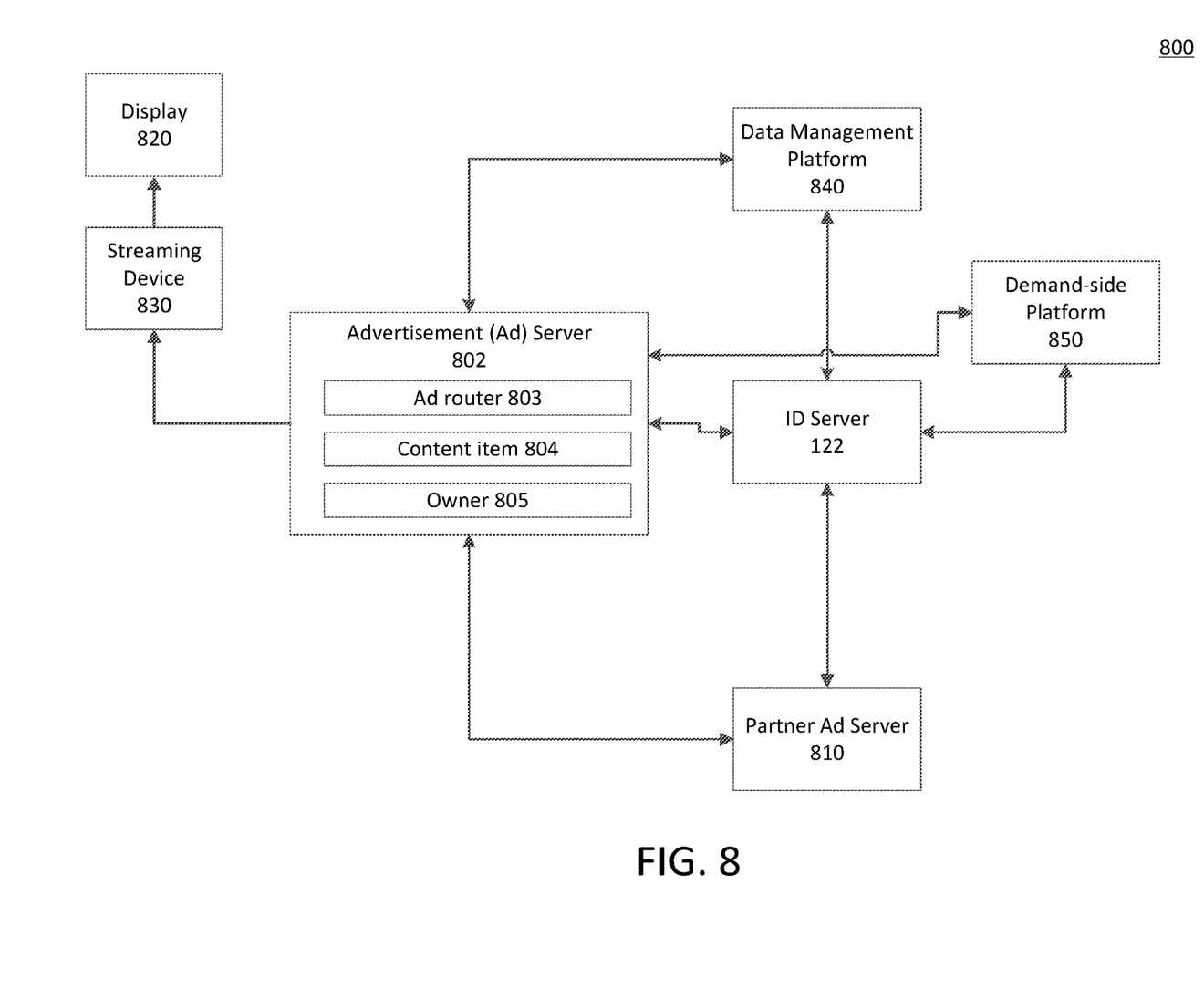
FIG. 8 shows an example content delivery system.

FIG. 8 shows an example content delivery system 800. System 800 may be used in combination with one or more devices in system 300 to generate, assign, and/or use identifiers. The system may include a streaming device 830 that may be used for streaming content items (e.g., as described in connection with FIG. 3 above). The streaming device 830 may be The streaming device 830 may connect, via a network, to an advertisement server 802 to receive a content item 804, and may output the content item to a display 820. The advertisement (ad) server 802 may determine advertisements to integrate into the content item 804. The ad server 802 may select and send the advertisements to the streaming device 830. Each ad and/or content item may be assigned an identifier by the ID server 122. The data management platform 840, demand-side platform 850, and/or the partner ad server 810 may request identifiers to assign to content items.

Insertion opportunities (e.g., ad placement opportunities) may be owned by multiple parties. The ad router 803 may route each insertion opportunity to the appropriate owner (e.g., to allow the owner to select the ad). For example 30% of the insertion opportunities may be routed to owner 805 (e.g., the owner of the ad server 802) and 70% of the insertion opportunities may be routed to partner ad server 810. The Ad server 802 may select an ad, for example, if the insertion opportunity belongs to owner 805. The ad may be associated with an identifier received from the ID server 122. Ad server 802 may select existing advertisements stored in the system (e.g., on ad server 802). Alternatively, ad server 802 may send real-time bid (RTB) requests to demand-side platform (DSP) 850 to receive advertisements. The ID server 122 may be used to generate IDs for RTB requests and/or RTB responses. Ad server 802 may send an ad request to partner ad server 810, for example, if an insertion opportunity belongs to the partner ad server 810. The request may include video information indicating the video, for which the insertion opportunity is associated. The partner ad server 810 may send a response, indicating an ad, to the ad server 802 after finishing the ad selection. The ID server 122 may assign an identifier to the ad sent by the partner ad server 810. The Ad server 802 may send advertisements selected by each owner to the streaming device 830. The streaming device 830 may output the advertisements to the display 820. The content delivery system 800 may use an identifier to identify an advertisement and retrieve the advertisement from a database. The content delivery system 800 may use an identifier to identify an advertisement that has been placed in an insertion opportunity (e.g., for billing and/or credit purposes).

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
    storing, in a buffer of a computing device, a first plurality of identifiers, wherein each identifier, of the first plurality of identifiers, is unique relative to other identifiers of the first plurality of identifiers;
    determining a usage rate of the first plurality of identifiers by monitoring network delay associated with:
        receiving, from one or more providers of content items for a content delivery network and via a network, requests for unique identifiers for each of a plurality of content items;
        retrieving, based on the requests and from the buffer of the computing device, a portion of the first plurality of identifiers as the unique identifiers for the plurality of content items; and
        sending, via the network, the portion of the first plurality of identifiers;
    determining, based on the usage rate of the first plurality of identifiers, a quantity of additional identifiers for use after exhaustion of the first plurality of identifiers;
    causing a database to store the determined quantity of additional identifiers; and
    storing, by the computing device and in the buffer of the computing device, the additional identifiers, wherein each of the additional identifiers is unique relative to other identifiers of the additional identifiers and relative to each identifier of the first plurality of identifiers.

2. The method of claim 1, wherein the storing the first plurality of identifiers comprises caching, in a random-access memory (RAM) of the computing device, the first plurality of identifiers.

3. The method of claim 1, wherein the first plurality of identifiers and the additional identifiers are associated with a first topic, wherein the requests comprise requests associated with the first topic, and wherein the method further comprises:
sending, based on additional requests associated with a second topic, identifiers of a second plurality of identifiers associated with the second topic, wherein each identifier, of the second plurality of identifiers, is unique relative to other identifiers of the second plurality of identifiers.

4. The method of claim 1, wherein the determining the usage rate further comprises determining a time period indicating an amount of time to generate the quantity of additional identifiers.

5. The method of claim 1, wherein the determining the usage rate comprises determining a speed of the network.

6. The method of claim 1, wherein the determining the quantity further comprises determining a quantity of the first plurality of identifiers.

7. The method of claim 1, wherein the determining the quantity further comprises:
comparing the usage rate to a maximum request rate.

8. The method of claim 1, wherein the determining the usage rate comprises determining an average of a plurality of request rates.

9. The method of claim 1, wherein the plurality of content items comprises one or more advertisements.

10. The method of claim 1, further comprising:
sending, after sending all of the first plurality of identifiers and based on additional requests from the one or more providers, the additional identifiers.

11. The method of claim 1, wherein the causing the database to store the determined quantity of additional identifiers comprises sending, based on the usage rate, a message to the database.

12. A method comprising:
buffering, by a computing device, a first plurality of identifiers, wherein each identifier, of the first plurality of identifiers, is associated with a first topic and is unique relative to other identifiers of the first plurality of identifiers;
determining a usage rate of the first plurality of identifiers by monitoring computing device delay associated with:
receiving, from one or more providers of content items for a content delivery network and via a network, requests for unique identifiers for each of a plurality of content items associated with the first topic;
retrieving, based on the requests and from the buffer of the computing device, a portion of the first plurality of identifiers as the unique identifiers for the plurality of content items; and
sending, via the network, the portion of the first plurality of identifiers;
determining, based on the usage rate of the first plurality of identifiers, a quantity of additional identifiers to use as backups for the first plurality of identifiers;
causing a database to store the determined quantity of additional identifiers; and
buffering, by the computing device, the additional identifiers, wherein each of the additional identifiers is unique relative to other identifiers of the additional identifiers and relative to each identifier of the first plurality of identifiers.

13. The method of claim 12, wherein the determining the usage rate further comprises determining a time period indicating an amount of time to gernerate the quantity of additional identifiers.

14. The method of claim 12, wherein the determining the usage rate comprises determining a speed of the network.

15. The method of claim 12, wherein the determining the quantity further comprises determining the quantity based on a quantity of the first plurality of identifiers.

16. The method of claim 12, wherein the causing the database to store the determined quantity of additional identifiers comprises sending, based on the usage rate, a message to the database.

17. A method comprising:
storing, by a buffer of a computing device, a first plurality of identifiers, wherein each identifier, of the first plurality of identifiers, is unique relative to other identifiers of the first plurality of identifiers;
determining a usage rate of the first plurality of identifiers by monitoring computing device delay associated with:
receiving, from one or more providers of content items for a content delivery network and via a network, requests for unique identifiers for each of a plurality of content items;
retrieving, based on the requests and from the buffer of the computing device, a portion of the first plurality of identifiers as the unique identifiers for the plurality of content items; and
sending, via the network, the portion of the first plurality of identifiers;
determining, based on the usage rate of the first plurality of identifiers, a quantity of additional identifiers;
causing a database to store the determined quantity of additional identifiers; and
storing, by the computing device, the additional identifiers, wherein each of the additional identifiers are unique relative to other identifiers of the additional identifiers and relative to each identifier of the first plurality of identifiers.

18. The method of claim 17, wherein the plurality of content items comprises one or more advertisements.

19. The method of claim 17, wherein the first plurality of identifiers and the additional identifiers are associated with a first topic, wherein the requests comprise requests associated with the first topic, and wherein the method further comprises:
sending, based on additional requests associated with a second topic, identifiers of a second plurality of identifiers associated with the second topic, wherein each identifier, of the second plurality of identifiers, is unique relative to other identifiers of the second plurality of identifiers.

20. The method of claim 17, wherein determining the usage rate further comprises determining a time period indicating an amount of time to generate the quantity of additional indentifiers.

* * * * *

UNITED STATES PATENT AND TRADEMARK OFFICE
CERTIFICATE OF CORRECTION

PATENT NO. : 11,995,681 B2
APPLICATION NO. : 17/168794
DATED : May 28, 2024
INVENTOR(S) : Cao et al.

Page 1 of 1

It is certified that error appears in the above-identified patent and that said Letters Patent is hereby corrected as shown below:

In the Claims

Column 18, Line 6:
In Claim 13, delete "gernerate" and insert --generate--

Column 18, Line 60:
In Claim 20, delete "indentifiers." and insert --identifiers.--

Signed and Sealed this
Eleventh Day of March, 2025

Coke Morgan Stewart
*Acting Director of the United States Patent and Trademark Office*